United States Patent
Cain

(10) Patent No.: US 10,248,522 B1
(45) Date of Patent: Apr. 2, 2019

(54) SYSTEM AND METHOD FOR AUTOMATIC FEEDBACK/MONITORING OF AVIONICS ROBUSTNESS/CYBERSECURITY TESTING

(71) Applicant: Rockwell Collins, Inc., Cedar Rapids, IA (US)

(72) Inventor: Brian S. Cain, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 148 days.

(21) Appl. No.: 15/226,642

(22) Filed: Aug. 2, 2016

(51) Int. Cl.
*G06F 11/00* (2006.01)
*G06F 11/263* (2006.01)
*G06F 11/22* (2006.01)

(52) U.S. Cl.
CPC ........ *G06F 11/263* (2013.01); *G06F 11/2273* (2013.01)

(58) Field of Classification Search
CPC .................. G06F 11/263; G06F 11/2273
See application file for complete search history.

(56) References Cited

U.S. PATENT DOCUMENTS

| | | | |
|---|---|---|---|
| 8,819,834 B2 | 8/2014 | Petrica et al. | |
| 9,104,877 B1 * | 8/2015 | Allen | G06F 21/577 |
| 2012/0222013 A1 * | 8/2012 | Zheng | G06F 11/3612 717/125 |
| 2013/0212435 A1 * | 8/2013 | Qiu | G06F 11/368 714/32 |
| 2015/0058680 A1 * | 2/2015 | Kortti | G06F 11/368 714/47.2 |
| 2015/0095507 A1 * | 4/2015 | Adams | G06F 11/3664 709/229 |
| 2017/0075784 A1 * | 3/2017 | Nakanishi | G06F 11/263 |
| 2017/0286279 A1 * | 10/2017 | Allison | G06F 11/3688 |

* cited by examiner

*Primary Examiner* — Philip Guyton

(74) *Attorney, Agent, or Firm* — Angel N. Gerdzhikov; Donna P. Suchy; Daniel M. Barbieri

(57) ABSTRACT

A system and method for automatic feedback and monitoring of avionics robustness and cybersecurity testing includes a fuzzer for generating fuzzed test cases based on legitimate data inputs and transmitting the test cases to various avionics systems under test (SUT). Individual monitor modules serve as monitors for particular devices, ports, or protocols of the SUT, determining states of the SUT before and after the test cases are introduced into the system by observing responses to system messages and regular system activities. Based on changes in system states, the monitor modules may determine system errors of the SUT, logging any determined errors along with associated test cases and system states for offline analysis.

20 Claims, 2 Drawing Sheets

SYSTEM AND METHOD FOR AUTOMATIC FEEDBACK/MONITORING OF AVIONICS ROBUSTNESS/CYBERSECURITY TESTING

BACKGROUND

Connected aircraft are becoming the new standard for retrofit operations as well as new deliveries. However, the fully connected aircraft of the future may come with built-in cybersecurity risks: namely, that exploitable vulnerabilities may be lying dormant within the delivered hardware or software. One technique for discovering potential vulnerabilities within connected avionics systems involves network fuzzing of the inputs to those systems. Fuzzing involves the generation of large quantities of test cases based on mutations of the standard inputs. The test cases may be logged so that the tester may repeat tests or analyze a test case, or sequence thereof, responsible for a system error. Fuzzing during initial testing may provide a preemptive defense against attackers using the same technique to probe systems for potential weaknesses.

SUMMARY

In one aspect, embodiments of the inventive concepts disclosed herein are directed to a system for automatic feedback and monitoring of avionics robustness and cybersecurity testing. The system may include a fuzzer configured to request a state of an avionics system under test (SUT) from one or more monitor modules connected to the SUT. The fuzzer may generate fuzzed test cases and transmit the fuzzed test cases to the system under test. The monitor modules may determine, upon request by the fuzzer, a current state of the SUT before and after the test cases are received. The monitor modules may determine errors of the SUT based on changes in system state caused by the test cases. The monitor modules may log any determined errors, along with the associated test cases or system states, for offline analysis.

In a further aspect, embodiments of the inventive concepts disclosed herein are directed to an apparatus for automatic feedback and monitoring of avionics robustness and cybersecurity testing. The apparatus may be a testing device connectable to an avionics SUT. The testing device may include processors configured to initialize a fuzzer and one or more monitor modules for monitoring specific system protocols. The testing device may connect the fuzzer and the monitor modules to the SUT. The fuzzer may request a current state of the SUT from the monitor modules. The fuzzer may generate fuzzed test cases transmit the fuzzed inputs to the SUT. The monitor modules may determine states of the SUT by sending system messages to specific ports of the SUT and awaiting a response, or by detecting periodic system activities of the SUT. The monitor modules may determine errors of the SUT based on changes in system state resulting from the transmitted test cases. The monitor modules may log for offline analysis any determined errors along with their associated test cases and system states.

In a still further aspect, embodiments of the inventive concepts disclosed herein are directed to a method for automatic feedback and monitoring of avionics robustness and cybersecurity testing. The method may include initializing a fuzzer and one or more monitor modules via a testing system. The method may include connecting the fuzzer and the monitor modules to an avionics system under test. The method may include determining, via the monitor modules, a current state of the SUT upon request by the fuzzer. The method may include generating, via the fuzzer, fuzzed test cases and transmitting the test cases to the SUT. The method may include determining, via the monitor modules, a second state of the SUT (reflecting the transmitted test cases) upon request by the fuzzer. The method may include determining, via the monitor modules, errors of the SUT based on changes in system state resulting from the test cases. The method may include logging for offline analysis, via the monitor modules, the determined errors along with any associated test cases and system states.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
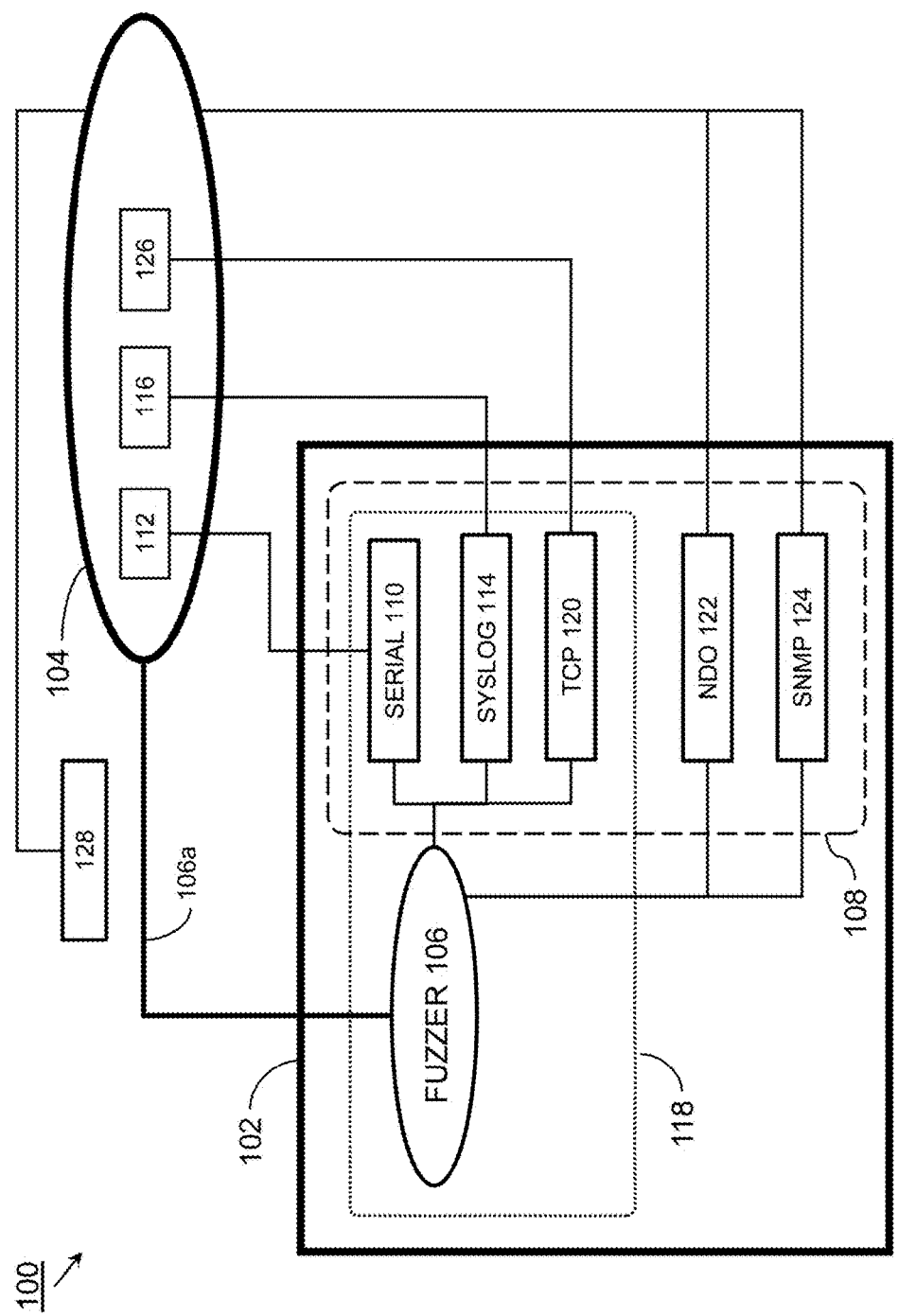
FIG. 1 illustrates an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for automated monitoring of robustness and cybersecurity testing for avionics systems. The system solves the problem of automatically monitoring aircraft systems by probing the systems for potential weaknesses and logging any identified error conditions along with their contributing inputs for offline analysis. Automated testing allows for a larger volume of test cases, but also reduces costs by being performable continually during off-peak hours during development.

Referring to FIG. 1, an exemplary embodiment of a system 100 for automatic feedback and monitoring of avionics robustness and cybersecurity testing according to the inventive concepts disclosed herein may include a testing system 102 (e.g., a laptop or similar portable computing device) and an avionics system under test (SUT) 104. The testing system 102 may initiate a fuzzer 106 (e.g., fuzzing instance) and one or more monitor modules 108 (e.g., an ErrorWatch monitor or process). For example, the fuzzer 106 may serve as a master controller for directing the mutation of test cases (e.g., fuzzings, or mutations, of strings associated with data inputs or system messages of the SUT 104). Each of the monitor modules 108 may communicate with the fuzzer 106 for monitoring a particular protocol, subsystem, or aspect of the SUT 104.

The fuzzer 106 may, upon initialization by the testing system 102, be connected to the SUT 104 by a TCP connection 106a, while the monitor modules 108 may independently connect to the SUT 104 via TCP or any other appropriate protocol, e.g., via User Datagram Protocol (UDP) or interprocess communication (IPC). For example, a serial monitor 110 may connect serially to a serial device 112 (or a serial port) of the SUT 104, and a system logging (SYSLOG) monitor 114 may connect to a SYSLOG server 116 of the SUT 104.

The fuzzer 106 may be embodied in a Sulley framework or other similar fuzzing framework 118. The monitor modules 108 may be integrated into the fuzzing framework 118 or operate independently thereof. For example, the serial monitor 110, SYSLOG monitor 114, and TCP monitor 120 may be integrated into the fuzzing framework 118, and a network data object (NDO) monitor 122 and Simple Network Management Protocol (SNMP) monitor 124 may operate independently of the fuzzing framework 118. The set of monitor modules 108 implemented by the testing system 102 may include some or all of the above-mentioned examples, either integrated into a fuzzing framework 118 or operating independently thereof, as needed depending on the specifications of the SUT 104.

The fuzzer 106 may identify potentially exploitable code in the programming of the SUT 104. Based on errors in the SUT 104 associated with specific test cases generated by the fuzzer 106, security researchers may design custom attacks against the system code to recreate system crashes or other error conditions. For example, the fuzzer 106 may simulate attacks on the code by mutating known system inputs and messages to create corner cases. Fuzzing attacks may be based on mutating numbers (signed/unsigned integers, floats), characters (URLs, command-line inputs, ASCII or UTF-8 encoding schemes), metadata, or pure binary sequences in defined lists of known-to-be-dangerous values (e.g., zeroes, interpretable characters or instructions such as "/etc/password" or "/etc/shadow") such that the mutated data becomes invalid, unexpected, or random, triggering crashes, exceptions, or memory leaks in the executing code.

The monitor modules 108 may provide external monitoring by assessing the current state of the SUT 104 to determine if a system fault has occurred. For example, the fuzzer 106 may determine the current state of the SUT 104 by querying one of more of the monitor modules 108. The monitor modules 108 may determine a state of the SUT 104 by sending specific system messages to the SUT 104 and waiting for the appropriate response. Based on the received system response (or the lack of a system response within the appropriate time), the monitor modules 108 may compare a currently determined state of the SUT 104 with a previously determined state and thereby determine the presence of a system error. For example, the TCP monitor 120 may send pulse messages to the SUT 104 via a TCP port 126. Each pulse message may be associated with a particular pulse response or TCP acknowledgement (ACK), or a substring that must be found within the string returned by the SUT 104 for the string to be considered a successful or proper return value. If the TCP monitor 120 detects an improper response, or no pulse response is received within a predetermined time window, the TCP monitor 120 may determine a system error.

The SNMP monitor 124 may request specific system information from the SUT 104, e.g., a known Management Information Base (MIB) from a managed device 128 of an SNMP network of the SUT. If the request times out, e.g., if no MIB is received in response, the SNMP monitor 124 may determine a system error. The SNMP monitor 124 may also determine a system error based on one or more MIBs received from the SUT 104. For example, an MIB received by the SNMP monitor 124 may contain useful system information indicative of a system error or otherwise representing a change in the current state of the SUT 104, e.g., the number of times a processor of the SUT 104 has reset within a predetermined time window.

Certain monitor modules 108 may determine an error of the SUT 104 by observing specific regular activities of the SUT 104. For example, the serial monitor 110 may monitor and parse serial output of a serial device 112 of the system under test 104. If a configured error message is received from the serial device 112, the serial monitor 110 may determine a system error.

The SYSLOG monitor 114 may listen to SYSLOG event messages sent from various subsystems or devices of the SUT 104 to the SYSLOG server 116. If, for example, an alert or error condition is reported to the SYSLOG server 116, the SYSLOG monitor 114 may determine a system error.

The NDO monitor 122 may listen for periodic NDO messages sent by the SUT 104. If the periodic message is not received at the expected time, the NDO monitor 122 may determine a system error.

When the monitor modules 108 detect a system error, the system error may be logged along with any associated system inputs or outputs, such as system messages and associated responses or activities detected by the monitor modules 108. As the fuzzer 106 may request system states of the SUT 104 of the monitor modules 108 both before and after a given test case or sequence of test cases is transmitted, the monitor modules 108 may know which test cases or sequences thereof are associated with a particular system error, and may log the test cases and sequences associated with each determined system error. Logged system errors and associated data may be analyzed offline by the testing system 102 or externally thereto.

Figure 2:
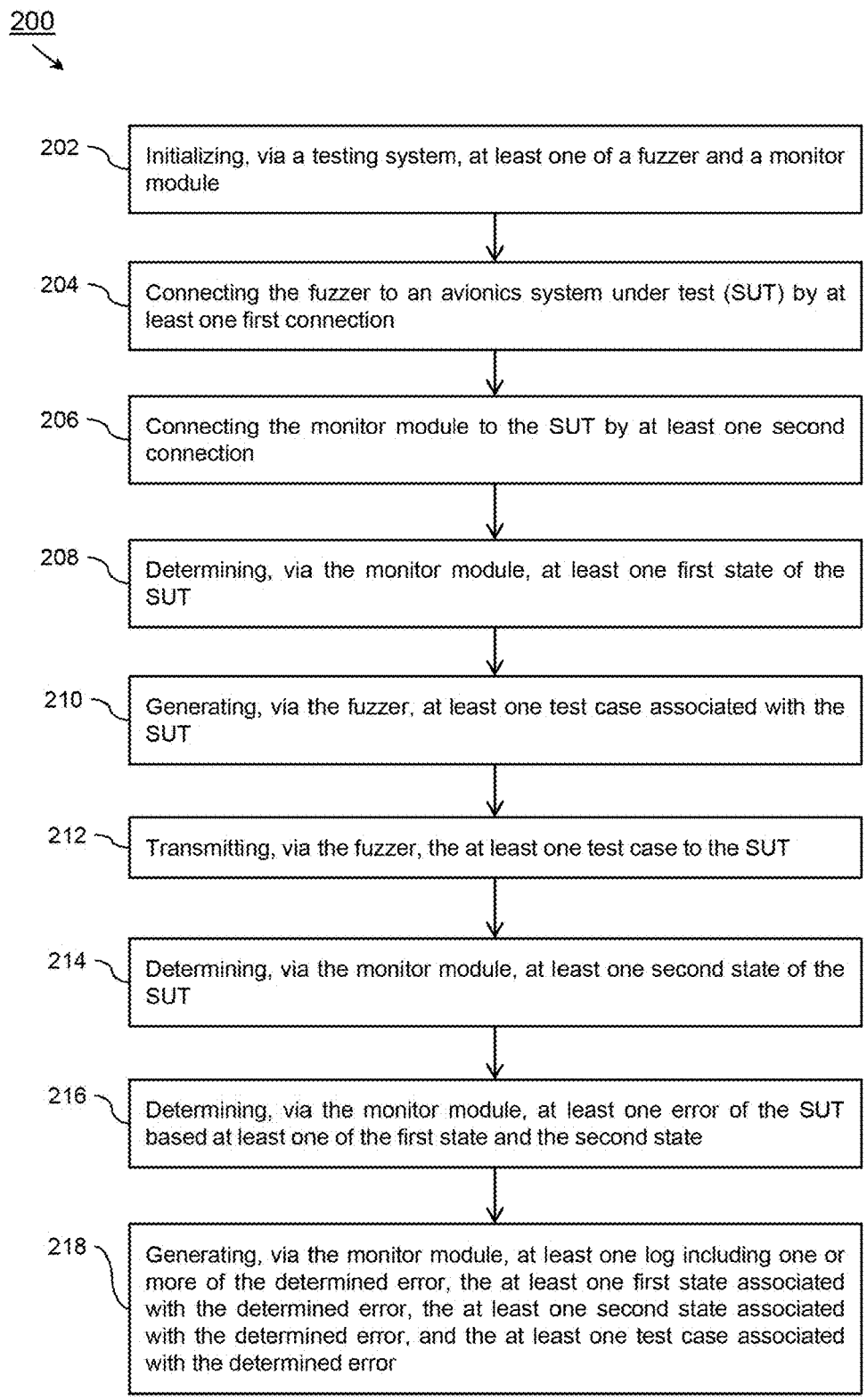
FIG. 2 illustrates an exemplary embodiment of a method according to the inventive concepts disclosed herein.

Referring now to FIG. 2, an exemplary embodiment of a method 200 for automatic feedback and monitoring of avionics robustness and cybersecurity testing according to the inventive concepts disclosed herein may be implemented by the system 100 in some embodiments, and may include one or more of the following steps.

At a step 202, the testing system may initialize a fuzzer and one or more monitor modules coupled to the fuzzer.

At a step 204, the testing system may connect the fuzzer to the avionics system under test (SUT) via a TCP connection.

At a step 206, the testing system may connect the monitor modules to the SUT. For example, monitor modules may be connected by the SUT by a TCP connection, a serial connection, a UDP connection, or an IPC connection.

At a step 208, the monitor module may determine a current state of the SUT upon request by the fuzzer.

At a step 210, the fuzzer may generate test cases associated with the SUT.

At a step 212, the fuzzer may transmit the generated test cases to the SUT.

At a step 214, the monitor modules may determine a subsequent state of the SUT, e.g., reflecting the processing of the test cases transmitted by the fuzzer. For example, the monitor modules may send system messages to the SUT and wait for the appropriate system response, e.g., a SNMP request for one or more MIBs, or a TCP pulse message expecting a TCP pulse response. The monitor modules may determine a system state by detecting regular system activity of the SUT, e.g., a SYSLOG event message, a serial output of a serial device of the SUT, or a periodic NDO message.

At a step 216, the monitor modules may determine system errors of the SUT based on the current and subsequent determined system states. For example, the monitor modules may determine system errors based on improper or missing regular activities, e.g., an NDO message not received within a predetermined time. The monitor modules may determine system errors based on received error messages, received system responses (e.g., a received MIB including system information indicative of a system error), or by comparing the subsequent system state to the current system state.

At a step 218, the monitor modules may generate logs of the determined system errors along with any associated current system states, subsequent system states, and test cases.

As will be appreciated from the above, systems and methods according to embodiments of the inventive concepts disclosed herein may provide a means for robustness testing of a broader variety of input scenarios that may lead to exploitable vulnerabilities. At the same time, the cost of testing may be reduced by allowing test cases to be utilized during non-peak hours.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A system for automatic feedback and monitoring of avionics robustness and cybersecurity testing, comprising:
   at least one fuzzer configured to be coupled to an avionics system under test (SUT) and configured to:
      request at least one initial state of the SUT from a monitor module coupled to the fuzzer;
      generate a plurality of test cases associated with the SUT; and
      transmit the plurality of test cases to the SUT;
   the at least one monitor module comprising an SNMP monitor, a serial monitor, a SYSLOG monitor, and a TCP monitor, configured to be coupled to the SUT via a serial connection, a SYSLOG server, and a TCP port, and to:
      request a management information base from a managed device in data communication with the SUT;
      determine at least one subsequent state of the SUT by at least one of 1) sending a system message to the SUT, the system message corresponding to a system response; and 2) detecting a regular activity of the SUT;
      determine at least one error of the SUT by comparing the subsequent state and the initial state, the determined error corresponding to at least one first test case of the plurality of test cases; and
      generate at least one log including one or more of the determined error, the associated initial state, the associated subsequent state, and the at least one first test case.

2. The system of claim 1, wherein the monitor module is configured to determine the at least one error based on at least one of:
   a received system response;
   a received error message;
   an improper regular activity;
   a missing regular activity; and
   a comparison of a first determined state of the SUT to a second determined state of the SUT.

3. The system of claim 1, wherein the fuzzer is associated with a fuzzing framework, and the at least one monitor module includes at least one of:

a first monitor module integrated into the fuzzing framework; and
a second monitor module independent of the fuzzing framework.

4. The system of claim 1, wherein:
the fuzzer is coupled to the SUT by at least one first TCP connection; and
the monitor module is coupled to the SUT by a UDP connection, and an IPC connection.

5. The system of claim 1, wherein the system message includes:
a TCP message corresponding to a TCP acknowledgement.

6. The system of claim 1, wherein the regular activity includes at least one of:
a SYSLOG message;
a serial output; and
a network data object (NDO) message.

7. An apparatus for automatic feedback and monitoring of avionics robustness and cybersecurity testing, the apparatus comprising:
a computing device configured to be coupled to at least one avionics SUT, the computing device including one or more processors configured to:
initialize at least one of a fuzzer and a monitor module coupled to the fuzzer;
connect the fuzzer to the SUT via at least one first connection;
connect the monitor module to the SUT via a serial connection, a SYSLOG server, and a TCP port;
the fuzzer configured to:
request at least one initial state of the SUT from the monitor module;
generate a plurality of test cases associated with the SUT; and
transmit the plurality of test cases to the SUT via the first connection;
the at least one monitor module comprising an SNMP monitor, a serial monitor, a SYSLOG monitor, and a TCP monitor, and configured to:
request a management information base from a managed device in data communication with the SUT;
determine at least one subsequent state of the SUT by at least one of 1) sending a system message to the SUT, the system message corresponding to a system response; and 2) detecting a regular activity of the SUT;
determine at least one error of the SUT by comparing the subsequent state and the initial state, the determined error corresponding to at least one first test case of the plurality of test cases; and
generate at least one log including one or more of the determined error, the associated initial state, the associated subsequent state, and the at least one first test case.

8. The apparatus of claim 7, wherein the monitor module is configured to determine the at least one error based on at least one of:
a received system response;
a received error message;
an improper regular activity;
a missing regular activity; and
a comparison of a first determined state of the SUT to a second determined state of the SUT.

9. The apparatus of claim 7, wherein the at least one fuzzer is associated with a fuzzing framework, and the at least one monitor module includes at least one of:

a first monitor module integrated into the fuzzing framework; and
a second monitor module independent of the fuzzing framework.

10. The apparatus of claim 7, wherein:
the fuzzer is coupled to the SUT by at least one first TCP connection; and
the monitor module is coupled to the SUT by a UDP connection, and an IPC connection.

11. The apparatus of claim 7, wherein the system message includes at least one of:
a SNMP message corresponding to at least one MIB; and
a TCP message corresponding to a TCP acknowledgement.

12. The apparatus of claim 7, wherein the regular activity includes at least one of:
a SYSLOG message;
a serial output; and
a network data object (NDO) message.

13. A method for automatic feedback and monitoring of avionics robustness and cybersecurity testing, the method comprising:
initializing, via a testing system, at least one of a fuzzer and a monitor module, the monitor module comprising an SNMP monitor, a serial monitor, a SYSLOG monitor, and a TCP monitor;
connecting the fuzzer to an avionics system under test (SUT) by at least one first connection;
connecting the monitor module to the SUT by a serial connection, a SYSLOG server, and a TCP port;
requesting a management information base from a managed device in data communication with the SUT;
determining, via the monitor module, at least one first state of the SUT;
generating, via the fuzzer, a plurality of test cases associated with the SUT;
transmitting, via the fuzzer, the plurality of test cases to the SUT;
determining, via the monitor module, at least one second state of the SUT;
determining, via the monitor module, at least one error of the SUT by comparing the first state and the second state, the determined error corresponding to at least one first test case of the plurality of test cases; and
generating, via the monitor module, at least one log including one or more of the determined error, the associated first state, the associated second state, and the at least one associated first test case.

14. The method of claim 13, wherein determining, via the monitor module, at least one second state of the SUT includes:
determining, via the monitor module, at least one second state of the SUT by at least one of:
sending at least one system message to the SUT, the system message corresponding to a system response; and
detecting at least one regular activity of the SUT.

15. The method of claim 14, wherein sending at least one system message to the SUT, the system message corresponding to a system response, includes:
sending at least one TCP message to the SUT, the TCP message corresponding to a TCP acknowledgement.

16. The method of claim 14, wherein detecting at least one regular activity of the SUT includes at least one of:
detecting at least one SYSLOG message of the SUT;
detecting at least one serial output of the SUT;

and detecting at least one NDO message of the SUT.

17. The method of claim 14, wherein determining, via the monitor module, at least one error of the SUT based at least one of the first state and the second state includes:

determining, via the monitor module, at least one error of the SUT based on at least one of an improper regular activity or a missing regular activity.

18. The method of claim 14, wherein determining, via the monitor module, at least one error of the SUT by comparing the first state and the second state, the determined error corresponding to at least one first test case of the plurality of test cases includes:

determining, via the monitor module, at least one error of the SUT based on at least one of the received system response the received error message.

19. The method of claim 13, wherein connecting the fuzzer to an avionics system under test (SUT) by at least one first connection includes:

connecting the fuzzer to the avionics SUT by at least one TCP connection.

20. The method of claim 13, wherein connecting the monitor module to the SUT includes:

connecting the monitor module to the SUT by at least one of a UDP connection, and an IPC connection.

\* \* \* \* \*